(12) United States Patent
Schoenherr

(10) Patent No.: US 11,993,245 B2
(45) Date of Patent: May 28, 2024

(54) METHOD FOR OPERATING A VEHICLE

(71) Applicant: Daimler AG, Stuttgart (DE)

(72) Inventor: Gudrun Schoenherr, Holzgerlingen (DE)

(73) Assignee: Daimler AG, Stuttgart (DE)

( * ) Notice: Subject to any disclaimer, the term of this patent is extended or adjusted under 35 U.S.C. 154(b) by 656 days.

(21) Appl. No.: 17/256,930

(22) PCT Filed: Jul. 2, 2019

(86) PCT No.: PCT/EP2019/067695
§ 371 (c)(1),
(2) Date: Dec. 29, 2020

(87) PCT Pub. No.: WO2020/007837
PCT Pub. Date: Jan. 9, 2020

(65) Prior Publication Data
US 2021/0284038 A1    Sep. 16, 2021

(30) Foreign Application Priority Data

Jul. 2, 2018 (DE) ...................... 10 2018 005 252.5

(51) Int. Cl.
*B60W 10/30* (2006.01)
(52) U.S. Cl.
CPC .......... *B60W 10/30* (2013.01); *B60L 2250/12* (2013.01)
(58) Field of Classification Search
None
See application file for complete search history.

(56) References Cited

U.S. PATENT DOCUMENTS

| | | | |
|---|---|---|---|
| 10,631,029 B1 * | 4/2020 | Nijim | H04N 21/251 |
| 2013/0020864 A1 * | 1/2013 | Smajlovic | B60H 1/00657 |
| | | | 307/9.1 |
| 2013/0035812 A1 | 2/2013 | Bernard | |
| 2013/0038284 A1 | 2/2013 | LaFrance | |
| 2014/0258457 A1 | 9/2014 | Han et al. | |
| 2014/0316630 A1 | 10/2014 | Kohlberger et al. | |
| 2016/0042401 A1 * | 2/2016 | Menendez | G06Q 30/0261 |
| | | | 705/14.43 |

(Continued)

FOREIGN PATENT DOCUMENTS

| | | |
|---|---|---|
| CN | 102887045 A | 1/2013 |
| CN | 102887046 A | 1/2013 |

(Continued)

OTHER PUBLICATIONS

PCT/EP2019/067695, International Search Report dated Oct. 9, 2019 (Two (2) pages).

(Continued)

*Primary Examiner* — Ryan Rink
(74) *Attorney, Agent, or Firm* — Crowell & Moring LLP

(57) ABSTRACT

A method tar operating a vehicle where at least one comfort function is offered to at least one vehicle user for activation. The at least one comfort function is offered to the at least one vehicle user for activation after a start of an electrical charging process of at least one energy storage device of the vehicle. The comfort function is offered to the vehicle user depending on an expected necessary charging time of the electrical charging process of the energy storage device of the vehicle.

10 Claims, 1 Drawing Sheet

(56) References Cited

U.S. PATENT DOCUMENTS

| | | | | |
|---|---|---|---|---|
| 2017/0084155 A1* | 3/2017 | Mese | ................... | H04M 1/724 |
| 2018/0370379 A1* | 12/2018 | Chen | ................... | B60L 53/665 |
| 2019/0126767 A1* | 5/2019 | Sakuma | ................ | G08G 1/143 |
| 2020/0094698 A1* | 3/2020 | Imai | ..................... | H04W 4/024 |

FOREIGN PATENT DOCUMENTS

| | | |
|---|---|---|
| CN | 102916462 A | 2/2013 |
| CN | 104583719 A | 4/2015 |
| CN | 105493378 A | 4/2016 |
| CN | 107117044 A | 9/2017 |
| CN | 206465797 U | 9/2017 |
| DE | 10 2017 000 882 A1 | 11/2017 |
| JP | 2004-96973 A | 3/2004 |
| KR | 10-2011-0004293 A | 1/2011 |
| WO | WO 2010/100081 A2 | 9/2010 |
| WO | WO 2017/083259 A1 | 5/2017 |

OTHER PUBLICATIONS

Chinese Office Action issued in Chinese application No. 201980044917.2 dated Aug. 31, 2022, with partial English translation (Fourteen (14) pages).

Chinese Office Action issued in Chinese Application No. 201980044917.2 dated Jul. 14, 2023, with partial English translation (11 pages).

English machine translation of B1, previously cited on Dec. 29, 2020 (46 pages).

* cited by examiner

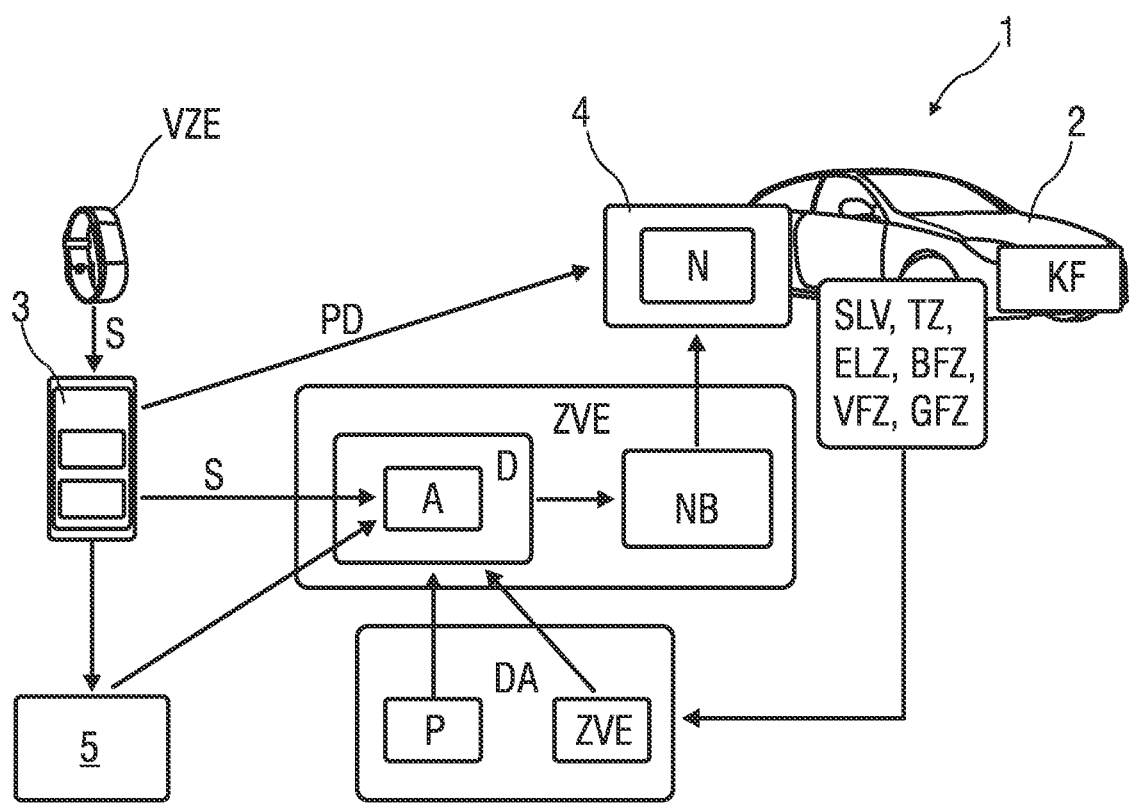

METHOD FOR OPERATING A VEHICLE

BACKGROUND AND SUMMARY OF THE INVENTION

The invention relates to a method for operating a vehicle.

As described in DE 10 2017 000 882 A1, a method for operating a vehicle is known from the prior art. In this method, an active guidance of the vehicle is carried out, in which a navigation target is predetermined and a time period until a navigation target is reached is continuously determined. Depending on the predetermined navigation target, a selection of comfort functions of the vehicle are automatically activated or offered to a driver for manual activation.

The object of the invention is to specify a method for operating a vehicle which is improved compared with the prior art.

In a method for operating a vehicle, at least one comfort function is offered to at least one vehicle user, for example a vehicle driver and/or another vehicle occupant, for activation. In accordance with the invention, the at least one comfort function is offered to the at least one vehicle user for activation after the start of an electrical charging process of at least one energy storage device of the vehicle, wherein this electrical charging process takes place by means of an electrical energy source external to the vehicle, i.e., in particular at an electrical charging station, for example at a publicly accessible or private charging station. The at least one comfort function is offered to the vehicle user depending on an expected necessary charging time (ELZ).

This means that the vehicle is in particular designed as an electric vehicle, hybrid vehicle or fuel cell vehicle. The at least one energy storage device, which is designed in particular as an electrochemical energy storage device, thus serves in particular to store energy for driving the vehicle, i.e., the at least one energy storage device is designed in particular as a so-called traction battery of the vehicle.

By means of the method according to the invention, a charging time, in which the at least one energy storage device of the vehicle is charged and the vehicle can thus not be used for locomotion but is at a standstill, can be used in a sensible manner, in particular for mental and/or physical recovery, vitalization, relaxation and/or refreshment of the at least one vehicle user, in particular for a subsequent driving section, and/or for improving his/her health.

By way of example, the at least one comfort function is only offered to the at least one vehicle user if an expected necessary charging time reaches or exceeds a predetermined limit, for example 30 minutes. This means that an expected necessary charging time is predicted. If it is predicted that a charging time that reaches or exceeds the predetermined limit of, for example, 30 minutes, is likely to be necessary, the at least one comfort function will be offered to the at least one vehicle user after the start of the electrical charging process, in particular immediately after the start of the electrical charging process and the prediction of the expected necessary charging time. This ensures that the time available due to the charging process, during which the vehicle is stationary and therefore cannot be used for locomotion, is sufficient for the offered comfort function, such that this comfort function does not have to be interrupted prematurely.

Advantageously, the vehicle user is informed about the additional energy required for the at least one offered comfort function (KF) and the associated extension of the expected necessary charging time (ELZ). This enables him/her to estimate for himself how much the charging process, and thus the time he/she will spend at the charging station, will be extended by the comfort offer and thus prioritize it himself/herself.

By way of example, the at least one comfort function is only offered to the at least one vehicle user if it is determined that there is no project planning of the at least one vehicle user within the expected charging time. This is determined, for example, by accessing an electronic appointment calendar of the at least one vehicle user, for example by accessing at least one mobile terminal, in particular a mobile phone, of the at least one vehicle user. In this way, an offer of activating a comfort function, which is unnecessary since the at least one vehicle user has already planned another project, is avoided. In particular, an irritation of the at least one vehicle user and a possible distraction of the vehicle user from his/her already planned project are avoided.

The at least one comfort function is offered to the at least one vehicle user for activation, for example optically, in particular via at least one display unit in the vehicle, for example as a so-called notification. The display unit is, for example, a central unit of the vehicle, also referred to as a Head Unit, which is arranged in the area of an instrument panel of the vehicle, for example, or a component of such a central unit. This ensures that the at least one vehicle user makes use of the offer of the comfort function. Alternatively or additionally, the at least one comfort function can be offered to the at least one vehicle user for activation, for example acoustically, in particular by a voice output, and/or haptically and/or in another way optically.

The at least one offered comfort function is activated, for example, via at least one input unit of the vehicle or by a voice input of the at least one vehicle user. The at least one input unit can be, for example, the display unit designed to be touch-sensitive and/or another input unit. The activation can take place, for example, by touching an activation element shown on the touch-sensitive display unit, for example a so-called "play button", or by clicking on such an activation element shown on the display unit by means of another control element. This enables the at least one vehicle user to activate the offered at least one comfort function by a, corresponding active action or to refrain from activating it. In particular, an automatic activation of the comfort function potentially not desired by the at least one vehicle user is thus avoided.

The at least one comfort function comprises, for example, at least one optical, acoustic and/or haptic output, in particular information output, in the vehicle and/or a setting of ambient conditions in the vehicle. The acoustic output can comprise, for example, an output of music and/or of voice information. The optical output can, for example, comprise representations on at least one display unit of the vehicle, for example on the display unit of the vehicle which is designed as a central unit or is a component of this central unit. The haptic output can, for example, comprise a massage function, which is performed in particular via, a vehicle seat on which the at least one vehicle user is sitting. The adjustment of the ambient conditions can comprise, for example, an adjustment of lighting, in particular ambient lighting, an air conditioning adjustment, in particular a temperature and/or ventilation adjustment, an opening adjustment of side windows, roof windows and/or a folding or retractable roof of the vehicle, a fragrance adjustment of an interior of the vehicle, a seat adjustment of the vehicle seat on which the at least one vehicle user sits, and/or an adjustment of seat air conditioning, in particular seat heating and/or seal ventilation, of the vehicle seat on which the at least one user sits.

In this way, the mental and/or physical recovery, vitalization, relaxation and/or refreshment of the at least one vehicle user can be optimized.

In a possible embodiment of the method, the at least one vehicle user is offered several comfort functions for activation. In this way, the at least one vehicle user can select and activate one or more of the offered comfort functions according to his/her wishes and needs, whereby the mental and/or physical recovery, vitalization, relaxation anchor refreshment of the at least one vehicle user and/or the improvement of his/her health is optimized.

Advantageously, the at least one vehicle user selects which comfort aspects he/she gives priority to before the offer of a comfort function (KF). Subsequently, an optimized selection of comfort functions can be offered to him/her, according to his/her specifications. It is thus achieved that the method contains a higher individual component and is better adapted to the specific needs of the vehicle user.

By way of example, the at least one vehicle user is offered a selection of comfort functions for activation from a set of available comfort functions. He/she can then activate one or more comfort functions from this selection. In this embodiment, not all available comfort functions are offered to the at least one vehicle user, but only those that are particularly suitable for the current situation.

The at least one comfort function or the selection of the comfort functions is offered for activation depending, for example, on a time of day, on a previous journey time, on an expected upcoming journey time, on an expected total journey time, on the expected necessary charging time and/or on a vital state of the at least one vehicle user. The vital state comprises, for example, a stress level, tiredness, a duration and/or intensity of at least one past sleep phase, an attention level, a state of health and/or at least one vital parameter. Thus, the at least one vehicle user is offered comfort functions for activation, which fit particularly well to the current situation characterised in this way and therefore contribute particularly to the mental and/or physical recovery, vitalization, relaxation and/or refreshment of the at least one vehicle user.

A determination of the at least one comfort function to be offered for activation or the selection of comfort functions to be offered for activation is carried out, for example, in the vehicle or externally to the vehicle, in particular in a central processing device of, for example, a manufacturer of the vehicle, also referred to as vehicle backend. With the vehicle-external variant, particularly large databases and processing capacities can be kept available outside the vehicle, such that the vehicle and its components are relieved of this. In the case of the vehicle-internal variant, this can be carried out without a communication link to vehicle-external units and thus autonomously.

As a comfort function, the at least one vehicle user is offered, for example, a short sleep program, i.e., support for having a short sleep, also referred to as a power nap, a nutritional training program, a sports training program, a muscle activation program, a muscle relaxation program, a balance program, a mental fitness training program, a heat program, a vitality program, a joy program, an advice program, a massage program, an entertainment program and/or a walking program for activation. By way of example, the walking program is offered for activation if there is a scenic environment and/or an interesting tourist destination, also referred to as a Point of Interest (POI), near the vehicle. The walking program then contains, for example, a recommendation to visit these surroundings and/or this tourist destination, i.e., in particular a recommendation to walk there, and for example a corresponding route description, wherein advantageously a duration of this walk, in particular via the corresponding route description, is adapted to a duration of the expected necessary charging time.

Exemplary embodiments of the invention are explained in more detail below using a drawing.

BRIEF DESCRIPTION OF THE DRAWING

The FIGURE shows, schematically, a method for operating a vehicle.

DETAILED DESCRIPTION OF TILE DRAWING

The FIGURE shows a schematic depiction of a method for operating a vehicle 2, in particular an architecture 1, i.e., in particular equipment for carrying out the method.

The vehicle 2 is in particular designed as an electric vehicle, hybrid vehicle or fuel cell vehicle. It has at least one energy storage device which can be charged in an electrical charging process by means of an external energy source, i.e., a publicly accessible or private charging station, for example, which is designed in particular as an electrochemical energy storage device. This at least one energy storage device serves in particular to supply electrical energy to at least one electric drive motor in order to carry out electrical driving operation of the vehicle 2. Such an energy storage device is also referred to as a traction battery.

Such vehicles 2, or more precisely their energy storage units, must therefore be charged again and again, wherein longer charging times arise for this. By way of example, a quick charge or an incomplete, for example demand-oriented, charge takes at least 30 minutes. This time can be used by a vehicle user in a meaningful way, in particular for mental anal/err physical recovery, vitalization, relaxation and/or refreshment of the at least one vehicle user, in particular for a subsequent journey section, and/or for the improvement of his/her health.

Therefore, in the method described here for the operation of the vehicle 2, the at least one vehicle user of the vehicle 2, in particular a vehicle driver and/or another vehicle occupant of the vehicle 2, is offered at least one comfort function KF for activation after a start SLY of the electrical charging process of the at least one energy storage device of the vehicle 2. For this purpose, the start SLV of the electrical charging process is recognized, for example in a central unit 4 of the vehicle 2, also referred to as Head Unit, and advantageously converted into a corresponding offer to the at least one vehicle user.

The at least one comfort function KF for activation is then displayed on a display unit of the central unit 4, for example, in the form of a so-called notification, i.e., a short message, wherein an activation element, for example a so-called "Play Button", is displayed, by means of which the comfort function KF can be activated. For this purpose, the display unit is designed to be touch-sensitive, for example, such that it also serves as an input unit. Alternatively or additionally, there is the possibility of activation by voice input from the at least one vehicle user.

As a comfort function KF, the at least one vehicle user is offered, for example, a short sleep program, i.e., support for having a short sleep, also referred to as a power nap, a nutritional training program, a sports training program, a muscle activation program, a muscle relaxation program, a balance program, a mental fitness training program, a heat program, a vitality program, a joy program, an advice program, a massage program, an entertainment program and/or a walking program for activation.

By way of example, the walking program is offered for activation if there is a scenic environment and/or an interesting tourist destination, also referred to as a Point of Interest (POI), near the vehicle 2. The walking program then contains, for example, a recommendation to visit these surroundings and/or this tourist destination, i.e., in particular a recommendation to walk there, and for example a corresponding route description, wherein advantageously a duration of this walk, in particular via the corresponding route description, is adapted to a duration of the expected necessary charging time ELZ.

By way of example, the at least one comfort function KF is only offered to the at least one vehicle user if the expected necessary charging time ELZ reaches or exceeds a predetermined limit value, for example 30 minutes. This means that an expected necessary charging time ELZ is predicted. If it is predicted that a charging time is likely to be necessary which reaches or exceeds the predetermined limit of, for example, 30 minutes, the at least one comfort function KF will be offered to the at least one vehicle user after the start SLY of the electrical charging process, in particular immediately after the start SLV of the electrical charging process and the prediction of the expected necessary charging time ELZ.

In a possible embodiment of the method, the at least one vehicle user is offered a selection of comfort functions KF for activation from a set of available comfort functions KF. He/she can then activate one comfort function KF or several comfort functions KF from this selection.

The at least one comfort function KF or the selection of the comfort functions KF is offered for activation, for example, depending on the expected necessary charging time ELZ, on a current time of day TZ, on a previous journey time BFZ, on an expected upcoming journey time VFZ, on an expected total journey time GFZ and/or on a vital condition of the at least one vehicle user. The vital state comprises, for example, a stress level, tiredness, a duration and/or intensity of at least one past sleep phase, an attention level, a state of health and/or at least one vital parameter.

A determination of the at least one comfort function KF to be offered for activation or of the selection of comfort functions KF to be offered for activation is carried out, for example, in vehicle 2 or external to the vehicle, in particular in a central processing unit ZVE of a manufacturer of the vehicle 2, also referred to as vehicle backend.

Thus, in the method, if the expected necessary charging time ELZ reaches or exceeds the predetermined limit, e.g., 30 minutes, and the at least one vehicle user might be tired, e.g., due to a previous journey time BFZ and a current time of day TZ, the short sleep program is, for example, offered for activation, i.e., a short sleep, also referred to as a power nap, is recommended to the at least one vehicle user, and this is supported by the short sleep program.

If, for example, the nutritional training program might be desired by the vehicle user due to a previous journey time BFZ of the vehicle and a current time of day TZ, this nutritional training program is correspondingly offered for activation. Alternatively or additionally, one or more of the above-mentioned programs can be offered for activation.

The FIGURE shows the execution of an exemplary embodiment of this method using the architecture 1 to carry it out.

The vehicle 2 has at least one comfort function KF or advantageously several comfort functions KF which can be executed. It detects the start SLV of the electrical charging process and reports this to a service activation DA.

The vehicle user can access a portal P, in particular a web portal, i.e., an internet portal, of a central processing unit ZVE of the vehicle manufacturer and activate a corresponding service D to perform this method. This service D is then activated by the central processing device ZVE, for example per journey or until revoked by the vehicle user.

The service D for carrying out the method accesses a server 5, also referred to as a backend, of a vital condition detection device VZE to detect a vital condition of the vehicle user. The vital state detection unit VZE is, for example, a corresponding sensor wristband to record corresponding sensor data, for example pulse data PD and/or movement data, to determine the vital state of the vehicle user. In this way, for example, the sleeping behavior of the vehicle user before starting a journey can be taken into account.

This sensor data is transmitted, for example, via the vehicle user's mobile terminal 3, in particular a mobile phone, to the server 5 of the vital status detection device VZE. The pulse data PD can, for example, alternatively or additionally, also be transmitted directly to the central unit 4 of the vehicle 2 by means of this mobile terminal 3, for example to determine a vital state while driving. A corresponding signal S for determining the vital state can, for example, be transmitted from the vital state detection device VZE to the mobile terminal 3 and from there, in particular via a program installed on it, to the central processing device ZVE of the vehicle manufacturer.

The service D for carrying out the method now determines, if the above-mentioned prerequisites are met and in particular depending on the time of day TZ, on the previous journey time BFZ, on the expected upcoming journey time VFZ, on the expected total journey time GFZ, for example determined by the vehicle 2, and on the expected journey times VFZ, GFZ, for example by a navigation system of the vehicle 2, and/or from the vital state of the vehicle user by means of a corresponding algorithm A, the comfort functions KF to be offered to the vehicle user for activation and initiates a corresponding display via a notification area NB in the central processing device ZVE, i.e., a notification N about the comfort functions KF offered for activation, on the display unit of the central unit 4 of the vehicle 2. The time of day TZ, the previous journey time BFZ, the expected upcoming journey time VFZ and/or the expected total journey time GFZ are determined by vehicle 2, for example, and in the case of the expected journey times VFZ, GFZ, by a navigation system of the vehicle 2, for example.

To refine the method, energy efficiency factors are included in the selection of the comfort functions KF which are offered to the vehicle user during the charging phase as described above.

On the one hand, the vehicle user is informed at the beginning of the charging phase how long the charging phase will last, i.e., he/she is first informed about the expected necessary charging time ELZ. In addition, the offer of comfort functions KF is dependent on this duration. By way of example, the user is only offered the comfort functions KF which can also be performed or completed within this charging time ELZ.

As an alternative or in addition to the offered comfort functions KF, the vehicle user is informed how much time it will take to carry out this comfort function KF and by how much the expected necessary charging time ELZ will be extended. It is also possible to display the additional energy that will be expected to be used to perform the comfort function KF. With the help of this additional information, the vehicle user is able to decide for himself herself whether it is worth his/her while to carry out this function, if the charging time of the vehicle 2 is thus extended by a certain amount of time. The vehicle user can then carry out his/her own prioritization.

In addition, the vehicle user is given further suggestions for comfort offers that are even more suitable for him/her at this point in time, and is offered the choice and supplemented by information about how much longer the execution of the comfort function KF would take than is absolutely necessary for the charging phase.

Furthermore, the information can additionally be provided to the vehicle user about the positive consequences of accepting the offer or performing the comfort function KF for him/her, for the environment (e.g., the traffic situation is better later) and for the vehicle. By way of example, the traffic situation could improve at a later point in time, the air conditioning of the interior could be optimized by a longer dwell time or the battery could be conditioned more completely.

In a further embodiment of the method, the vehicle user is offered a selection menu before a comfort function is offered, i.e., in advance, which comfort aspects are important to him/her at that time. He/she could, for example, decide whether he/she considers activation, sleep, relaxation, eating, moving outside the vehicle, sustainability, energy efficiency, conditioning of the vehicle etc. to be more important aspects. Accordingly, this aspect could be included as a criterion in the selection of the comfort function KF offered to the vehicle user. Thus, a high degree of adaptation of the method to the individual needs of the vehicle user at this particular point in time is achieved.

The invention claimed is:

1. A method for operating a vehicle, comprising the steps of:
   starting an electrical charging process of an energy storage device of the vehicle by an electrical energy source external to the vehicle at an electrical charging station; and
   offering a comfort function providable by the vehicle to a vehicle user for activation optically via a notification displayed on a display unit of the vehicle, wherein the comfort function is offered to the vehicle user after the starting of the electrical charging process of the energy storage device of the vehicle;
   wherein the comfort function is offered to the vehicle user depending on an expected necessary charging time of the electrical charging process of the energy storage device of the vehicle;
   wherein the comfort function is offered to the vehicle user depending on a previous journey time and/or on an expected upcoming journey time and/or on an expected total journey time.

2. The method according to claim 1 further comprising the step of informing the vehicle user about energy required for the offered comfort function and an associated extension of the expected necessary charging time.

3. The method according to claim 1 further comprising the step of activating the offered comfort function via an input unit of the vehicle or by a voice input.

4. The method according to claim 1, wherein the comfort function is an optical output and/or an acoustic output and/or a haptic output in the vehicle and/or an adjustment of an ambient condition in the vehicle.

5. The method according to claim 1 further comprising the step of offering the vehicle user a plurality of comfort functions for activation.

6. The method according to claim 1 further comprising the step of selecting by the vehicle user a comfort aspect before the step of offering.

7. The method according to claim 1 further comprising the step of determining in the vehicle or externally to the vehicle a comfort function to be offered to the vehicle user.

8. The method according to claim 1, wherein the comfort function is a haptic output in the vehicle that comprises a massage function performed by a vehicle seat of the vehicle on which the vehicle user sits.

9. The method according to claim 1, wherein the comfort function is an adjustment of an ambient condition in the vehicle.

10. The method according to claim 9, wherein the ambient condition in the vehicle comprises a seat adjustment of a vehicle seat of the vehicle on which the vehicle user sits.

* * * * *